(12) United States Patent
Faccin et al.

(10) Patent No.: US 7,702,309 B2
(45) Date of Patent: Apr. 20, 2010

(54) USING MAC ADDRESS OF A WLAN ACCESS POINT AS LOCATION INFORMATION

(75) Inventors: Stefano Faccin, Dallas, TX (US); Jan Kall, Espoo (FI)

(73) Assignee: Nokia Corporation, Espoo (FI)

( * ) Notice: Subject to any disclaimer, the term of this patent is extended or adjusted under 35 U.S.C. 154(b) by 823 days.

(21) Appl. No.: 11/272,061

(22) Filed: Nov. 14, 2005

(65) Prior Publication Data

US 2006/0252408 A1    Nov. 9, 2006

Related U.S. Application Data

(60) Provisional application No. 60/677,328, filed on May 4, 2005.

(51) Int. Cl.
*H04M 11/04*    (2006.01)
(52) U.S. Cl. .................... 455/404.2; 455/456.1
(58) Field of Classification Search ............. 455/404.2, 455/456.1, 404.1, 456.3, 456.5, 456.6; 709/222
See application file for complete search history.

(56) References Cited

U.S. PATENT DOCUMENTS

2004/0064562 A1* 4/2004 Huang .................. 709/227
2006/0140382 A1* 6/2006 Huey ..................... 379/220.01

FOREIGN PATENT DOCUMENTS

| EP | 1420553 | 5/2004 |
|----|---------|--------|
| EP | 1526697 | 4/2005 |

OTHER PUBLICATIONS

3GPP TR 23.867 V0.8.0 "*3rd Generation Partnership Project; Technical Specification Group Services and System Aspects; Internet Protocol (IP) Based IP Multimedia Subsystem (IMS) Emergency Sessions; (Release 7)*", Feb. 2005, pp. 1-76.
3GPP TS 23.002 V6.7.0 "*3rd Generation Partnership Project; Technical Specification Group Services and Systems Aspects; Network Architecture (Release 6)*", Mar. 2005, pp. 1-58.
3GPP TS 23.060 V6.8.0, "*3rd Generation Partnership Project; Technical Specification Group Services and System Aspects; General Packet Radio Service (GPRS); Service Description; Stage 2 (Release 6)*" Mar. 2005, pp. 1-212.

(Continued)

*Primary Examiner*—Sam Bhattacharya
(74) *Attorney, Agent, or Firm*—Banner & Witcoff, Ltd.

(57) ABSTRACT

The invention proposes a method for handling services requiring location information of a user terminal, wherein the user terminal is connected to a local network, a connection to an external network is provided via a network access means, and the network access means is identified by an identity, the method comprising the steps of extracting location information of the network access means based on the identity of the network access means, and determining the location of the user terminal based on the location information of the network access means. The invention also suggests a corresponding network control element.

31 Claims, 1 Drawing Sheet

OTHER PUBLICATIONS

3GPP TS 23.228 V6.9.0, "*3rd Generation Partnership Project; Technical Specification Group Services and System Aspects; IP Multimedia Substation (IMS); Stage 2 (Release 6)*", Mar. 2005, pp. 1-179.

3GPP TS 23.003 V6.6.0, "*3rd Generation Partnership Project; Technical Specification Group Core Network; Numbering, Addressing and Identification (Release 6)*" Mar. 2005, pp. 1-45.

3GPP TR 23.803 V0.3.1, "*3rd Generation Partnership Project; Technical Specification Group Services and System Aspects; Evolution of Policy Control and Charging (Release 7)*" Mar. 2005, pp. 1-14.

3GPP TS 24.229 V6.6.0, "*3rd Generation Partnership Project; Technical Specification Group Core Network; IP Multimedia Call Control Protocol Based on Session Initiation Protocol (SIP) and Session Description Protocol (SDP); Stage 3, (Release 6)*", Mar. 2005, pp. 1-291.

"*Using Cisco Emergency Responder for E911 Calls with the Cisco 7920*", Cisco Wireless IP 7920 Design and Deployment Guide, pp. 1-3.

"*Using Cisco Emergency Responder for E911 Calls with the Cisco 7920 Phone*", Appendix G, Cisco Wireless IP 7920 Design and Deployment Guide, pp. 1-2.

\* cited by examiner

USING MAC ADDRESS OF A WLAN ACCESS POINT AS LOCATION INFORMATION

CROSS-REFERENCE TO RELATED APPLICATIONS

This application claims priority of U.S. Provisional Patent Application No. 60/677,328, filed on May 4, 2005. The subject matter of this earlier filed application is hereby incorporated by reference.

BACKGROUND OF THE INVENTION

1. Field of the Invention

The invention relates to a method and a network control device for handling services based on location information.

2. Description of the Related Art

This invention is related to handling services based on location information. This issue is in particular important in case of emergency sessions.

3GPP is standardising emergency sessions in IMS (Internet Protocol (IP) Multimedia Subsystem), and IMS shall support several types of access networks like WLAN (Wireless Local Area Network) and fixed broadband in addition to the cellular network access. IMS shall support emergency sessions to be established irrespective of which access network is used. Location information is needed for the terminal in order to enable IMS to route the emergency session to the correct emergency centre.

The general approach in 3GPP is that the terminal shall include its own location information in the SIP (Session Initiation Protocol) Invite method when it initiates an emergency session in IMS. This location information consists of the cell identifier in cellular networks, but in WLAN and fixed broadband access, there is not yet any established solution, as to which type of location information should be used by the terminal.

The problem is similar in the cellular networks, but there the MSC uses the cell identity to route the emergency call to the correct emergency centre. In the fixed network the routing of emergency calls is probably based on databases in the fixed network switch, which is using the phone number and/or some other phone line identity. Cisco describes a solution where the WLAN network determines the location of the terminal using the MAC address of the WLAN TERMINAL to find out which switch port the corresponding AP is connected to and thereby the location of the AP.

This problem does not only occur in connection with WLAN, as described above, but also in other cases in which access to a general network is provided via a sub-network.

SUMMARY OF THE INVENTION

Hence, it is an object of the present invention to solve the problem mentioned above and to provide location information in order to handle location based services.

This object is solved by a method as set out in claim 1, and alternatively by a network control element as set out in claim 8.

That is, the location of a user terminal is determined based on the location information of a network access means (such as an Access Point in WLAN), wherein the location information of the network access means is determined based on an identifier thereof.

Hence, according to the present invention, the location of the terminal that uses, e.g., a WLAN AP, can be determined for emergency sessions but also for general location based services.

Further advantageous developments are set out in the dependent claims.

BRIEF DESCRIPTION OF THE DRAWINGS

The invention is described by referring to the enclosed drawings, in which.

DETAILED DESCRIPTION OF THE PREFERRED EMBODIMENTS

In the following, preferred embodiments of the present invention is described by referring to the attached drawings.

According to a first embodiment of the invention, a mechanism is introduced for a WLAN terminal to provide a server in the network with information that allows the server to determine the location of the user in the network. In detail, the WLAN terminal provides the network server (e.g. a 3GPP IMS server) with information identifying the specific Access Point the terminal is associated with, and the network maintains a map/database mapping the information on the AP to a specific location.

In detail, one possible implementation of the first embodiment is based on the WLAN terminal using the MAC address of the WLAN Access Point (AP) to identify the AP and send this MAC address to the network.

The location information is used for example by IMS (e.g., a 3GPP IMS server) when IMS routes an emergency session to the emergency centre corresponding to the terminal's location.

There is a need for the network operator to maintain a database in the network containing the identity of the AP, that is the MAC address, and the corresponding location of all specific WLAN APs. In this way, the network can determine the location of the AP.

Figure 1:
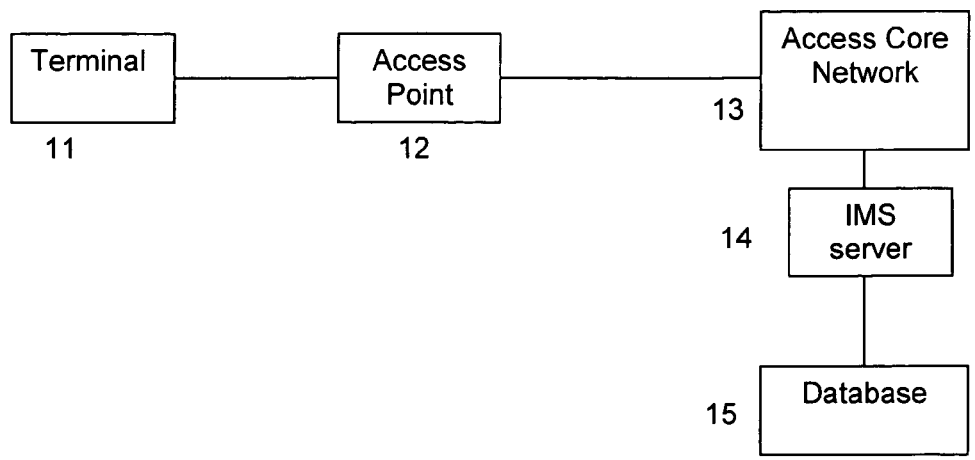
FIG. 1 shows the basic structure of a network system according to a first embodiment of the invention.

The basic configuration is shown in FIG. 1. According to FIG. 1, a WLAN terminal (e.g., a fixed computer, a laptop computer, a mobile phone or the like) 11 is connected to an Access Point (AP) 12. The Access Point 12 is connected, via a WLAN Access Core Network 13, with the IMS (IP Multimedia Subsystem), e.g., an IMS server 14, as mentioned above. The IMS server accesses the database 15, when necessary. It is noted that the database 14 may be arranged as a part of the IMS server 13, or may be arranged as a separate network element.

The terminal may include network related location information, that is the identity of the AP (the MAC address) in the SIP Invite it sends towards the IMS. As an alternative, IMS may request the location information regarding the terminal from the access network (i.e., the corresponding WLAN access core network) in question.

As an alternative, the terminal can itself request its own location information from the network using the identity of the AP (the MAC address) as the search key. The network sends a response back to the terminal containing the geographical location information, for example coordinates or street address. The terminal then includes this geographical location information in the SIP Invite it sends to IMS.

As another alternative, the IMS network may request the geographical location information from the WLAN network using the identity of the AP (it's MAC address) as the search key. The WLAN network then sends a response to the IMS network containing the geographical location information, for example coordinates, street address or even the address of the corresponding emergency centre(s).

Figure 2:
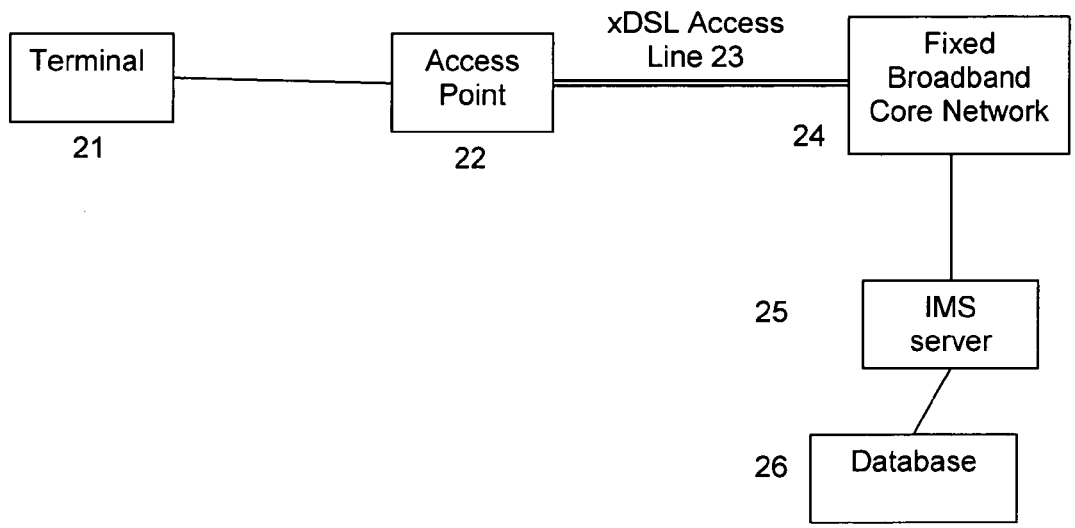
FIG. 2 shows the basic structure of a network system according to a second embodiment of the invention.

According to a second embodiment, a further example for the identity of a network access means is used. In detail, as shown in FIG. 2, the connection between the WLAN Access Point (AP) 22 and to the IMS is provided via an xDSL Access Line 23 (as an example for a broadband line), and using a fixed broadband core network 24. It is noted that xDSL comprises all kinds of Digital Subscriber Line (DSL), such as ADSL (Asynchronous DSL), HDSL (High bit-rate Digital Subscriber Line, RADSL (Rate-Adaptive DSL), SDSL (Symmetric DSL) and others. The xDSL Access line 23 also comprises an identity, so that location information of the particular xDSL Access line can also be stored in a database, similar as in the case with the Access Point according to the first embodiment.

The remaining elements shown in FIG. 2, i.e., the terminal 21, the IMS server 25 and the database 26 are similar to the corresponding elements shown in FIG. 1.

The solution as described above in connection with the first and second embodiments also applies for a solution being developed by ETSI-TISPAN, so that the terminal or the network uses the identity of the AP—its MAC address (or the corresponding xDSL line identifier) as a search key to get geographical location information. In TISPAN's terms the location will be maintained in and provided by the so-called "Connectivity Session Location and Repository Function" (CLF). In this case the CLF can provide the terminal or the network with the geographical location information corresponding to the AP the terminal is currently using.

The geographical location of the AP must be defined and kept updated in the WLAN/TISPAN access network by the operator owning the APs.

In case already the WLAN access network provides geographical location information, IMS can simply select which emergency centre serves that location. IMS need not know anything about the network related location information like MAC addresses and xDSL line identifiers.

The solution as described above in the first and second embodiment is easy to implement, since the AP's MAC address is typically available in the terminal and can be used as network location information for and by the terminal.

In the following some more detailed implementations are described. This is based on the Technical Report on IMS Emergency sessions 23.867, being part of Rel-7, in which it should be described how emergency calls are handled when the user terminal is using WLAN or fixed broadband access. In the following, methods are proposed for indicating the location of the emergency caller to be used for routing emergency sessions over GPRS, WLAN or fixed broadband access. With this approach, the PSAP/emergency centre will be informed about the location of the emergency already in the session establishment phase.

In the following, some basic issues are described:
  Adding a general principle that the terminal shall include location information when requesting an emergency session.
  Clarifying the location information to be used in GPRS access for emergency sessions
  Adding location information to be used for emergency sessions using public WLAN access and privately owned WLAN Access Points.
  Describing the ongoing work in TISPAN regarding location information for fixed broadband access and how that information could be used for emergency sessions.
The UE should be able to detect an emergency service request from the user and be aware of its own location at that time. When the UE initiates an IMS emergency session the general approach is that the UE shall include the information about its own location in the SIP INVITE request that the UE sends to the P-CSCF (Proxy Call State Control Function). The S-CSCF (Serving CSCF) shall route the emergency request to the PSAP (Public Safety Answering Points)/emergency centre based on the location information provided by the terminal. This means that the S-CSCF shall use the location information received from the UE to determine the routing address of the corresponding PSAP/emergency centre. There are access dependent implications with this general approach, which are described below, for the cases where the UE is using GPRS, WLAN or fixed broadband access for emergency service.

IMS forwards the terminal's location information in the SIP INVITE it sends to the PSAP/emergency centre. The location information that IMS forwards to the PASP/emergency centre is either the network based location information originally sent by the terminal itself, or IMS is able to replace this information with, for example, the corresponding geographical coordinates or civil address of the terminal. In this way, the PSAP/emergency centre gets either the network based location information or the corresponding geographical location directly and there is no need for the PSAP/emergency centre to request further information about the location of the emergency. The emergency centre, however, may need to request updated location information for terminals moving around using GPRS access, as described below.

Next, handling of emergency location information in GPRS is described. In GPRS, the location information to be used by the UE when initiating an emergency session shall be the cell identity. It is noted that the UE normally is not aware of SAI (Service Are Identity) and therefore SAI cannot be used as location information in SIP signalling.

In order to provide LCS (LoCation Service) information of a UE to an emergency centre, the following procedure related to location services (LCS) may be used for emergency service.

At any time after detecting an emergency situation (i.e., after emergency Attach, Service Request for emergency, PDP context activation towards emergency APN or SRNS relocation or RAU towards a new SGSN), SGSN may initiate Packet Switched Network Induced Location Request (PS-NI-LR) procedure.

As an alternative, Packet Switched Mobile Terminated Location Request (PS-MT-LR) procedure may be used for emergency service. No change is requested to the procedure itself, except PS-MT-LR location request will be initiated by emergency services LCS client through GMLC to the SGSN. The overall LCS procedure is described in the LCS stage-2 specification, see 3GPP TS 23.271.

Next, WLAN emergency location information are described. In particular, as described above in connection with the first embodiment, some identity of the WLAN Access Point (AP) could be used for location mapping in the same way as the cell identity is used in cellular networks. The AP identity could be for example the MAC address of the AP, which is typically available in the terminal.

The terminal can therefore use the MAC address of the WLAN AP as location information in the IMS emergency sessions. This solution is applicable at least for the APs under operator control (e.g., HotSpot access). But also the MAC addresses of privately owned WLAN APs (e.g., home users) could be included in a database.

With this solution, there is a need to maintain the location information of the operator controlled WLAN APs that may be used for IMS emergency services in order to route the emergency session to the correct PSAP/Emergency centre.

It is realised that the handling of privately owned WLAN APs is more demanding, since the AP owner or user could, for example, connect the AP to any xDSL connection and the owner/user of the AP can even change the MAC address on some WLAN equipment.

ETSI-TISPAN is investigating and developing solutions to offer IMS services using fixed broadband access, see next subchapter. It is seen that emergency sessions using privately owned WLAN AP's should be handled in the same way as emergency sessions using fixed broadband access, because normally the privately owned WLAN AP is connected to an xDSL fixed subscriber line.

(It may be that emergency sessions using operator owned WLAN APs also could be handled using the mechanisms being developed in TISPAN.)

In the following, emergency location information for fixed broadband access are described.

For fixed broadband access ETSI TISPAN is specifying a Network Attachment SubSystem (NASS). The Connectivity Session Location and Repository Function (CLF) registers the association between the IP address allocated to the Customer Premises Equipment (CPE) and related network location information provided by the Network Access Configuration Function (NACF), i.e. the access transport equipment characteristics, line identifier (Line ID), IP Edge identity and so on. The CLF registers the association between network location information received from the NACF and geographical location information.

TISPAN defines that the actual information delivered by the CLF may take various forms (e.g. network location, geographical coordinates, post mail address . . . ), depending on agreements with the requestor and on user preferences regarding the privacy of the location information.

In case of emergency sessions in a broadband access network the (xDSL) line identifier could be used as the "(dsl) location parameter" to identify the location of the terminal/customer network gateway (CNG). TISPAN is investigating several possibilities to utilize the location information of the terminal. The first alternative is that the terminal gets the location information from CLF, the second alternative is that the IMS core obtains the location information directly from the CLF and the third alternative is that the emergency centre itself requests location information from the Gateway Mobile Location Centre (3GPP-GMLC). The terminal based solution is not applicable for legacy terminals, the network based solution is against the general principle that the terminal shall provide the location and it also requires changes in the IMS network. The third solution is not applicable for routing purposes.

In order to follow the general principle described in the beginning of this chapter, the terminal should use the (xDSL) line identifier as location information, when using fixed broadband access to establish the emergency session. The terminal shall obtain this information from the CLF.

Also with this solution, there is a need to maintain the location information of the (xDSL) line identifiers that may be used for IMS emergency services in order to route the emergency session to the correct PSAP/Emergency centre.

The invention is not limited to the embodiments described above, and various modification are possible.

In particular, the network access means are not limited to the Access Point and/or the xDSL Access Line (as an example for a broadband line). For example, also other network access means are possible, such as a Modem (e.g., an ADSL modem), Ethernet cards or the like, as long as the network access means has an own identity, i.e., can be uniquely identified.

Furthermore the database described in connection with the first and second embodiments is only an example, an other forms of mapping between the identity of a network access entity (such as the AP) and the location information thereof can be applied.

Moreover, the above embodiments can be freely combined. That is, in order to enhance safety, the location information may be extracted based on more than one network access entity (e.g., AP and xDSL Access Line).

Summarizing, according to embodiments of the invention, the terminal uses the identity of network access means (such as the AP), which may be the MAC address of the AP, and the network can map this AP identity (as an example for the identity of the network access means) to the location of the AP.

The AP identity is used on the emergency application layer, and as an alternative it may be based on the MAC address of the AP and some other information added to distinguish the AP identity.

The AP identity may be standardized as a new emergency layer concept, which is not based on the MAC address. In this way one part of the invention is to map the AP identity (can be defined in different ways) against the location of the AP, which is the same as the location of the terminal. The location of the terminal is the wanted outcome of the process, so that the emergency centre knows where emergency terminal is located.

Moreover, the invention is not limited to the use of a local network. That is, the principles described above can also be applied to a case in which a user terminal is connected to a network via a further network element. For example, a laptop computer may be connected to a router (e.g., a DSL router or an Access Point including a DSL modem and the like) via fixed wiring. In this case, the location of the laptop computer (i.e., the user terminal) may be determined by using the location information regarding the router.

What is claimed:

1. A method, comprising:
   receiving an identity of a network accessor from an other device; and
   determining a location of the other device based on the identity of the network accessor,
   wherein the other device is connected to a local wireless network via the network accessor, and a connection to another network is provided via the network accessor.

2. The method according to claim 1, wherein the determining comprises using a mapping between the identity of the network accessor and the location information of the network accessor.

3. The method according to claim 2, wherein the mapping is stored in a database, and the determining comprises accessing the database.

4. The method according to claim 1, further comprising:
   routing a session to a second device based on the location information.

5. The method according to claim 4, wherein the session comprises an emergency session, and the second device comprises a terminal of an emergency center.

6. The method according to claim 1, wherein the identity of the network accessor is a media access control address and the determining uses the media access control address of the network accessor.

7. The method according to claim 1, wherein the local network comprises a wireless local area network and the network accessor comprises an access point and the determining uses the identity of the access point.

8. The method according to claim 1, wherein the network accessor comprises a broadband line and the receiving receives the identity of the broadband line.

9. An apparatus, comprising:
a processor; and
a memory including computer program code,
the memory and the computer program code configured to, with the processor, cause the apparatus at least to
receive an identity of a network accessor from another device, and
determine a location of the other device based on the identity of the network accessor,
wherein the other device is connected to a local wireless network via the network accessor, and a connection to another network is provided via the network accessor.

10. The apparatus according to claim 9, wherein the memory and the computer program code are further configured to, with the processor, cause the apparatus at least to use a mapping between the identity of the network accessor and the location of the network accessor.

11. The apparatus according to claim 10, wherein the mapping is stored in a database, and the memory and the computer program code are further configured to, with the processor, cause the apparatus at least to access the database.

12. The apparatus according to claim 9, wherein the memory and the computer program code are further configured to, with the processor, cause the apparatus at least to:
route a session to a second device based on the location information.

13. The apparatus according to claim 12, wherein the session comprises an emergency session, and the second device comprises a terminal of an emergency center.

14. The apparatus according to claim 9, wherein the identity of the network accessor comprises a media access control address.

15. The apparatus according to claim 9, wherein the local network comprises a wireless local area network and the network accessor comprises an access point.

16. The apparatus according to claim 9, wherein the network accessor comprises a broadband line.

17. A method, comprising:
receiving an identity of a network element from an other device; and
determining a location of a the other device based on the identity of the network element,
wherein the other device is connected to the network element providing a connection to a local wireless network and another network.

18. The method according to claim 17, wherein the network element comprises a network accessor, the other device is connected to a local wireless network, and a connection to the another network is provided via the network accessor.

19. The method according to claim 17, wherein the network element comprises an access point and the receiving comprises receiving the identity of the access point.

20. The method according to claim 17, wherein the network element comprises a broadband line and the receiving comprises receiving the identity of the broadband line.

21. A computer program embodied on a computer-readable medium, the computer program configured to control a processor to perform operations comprising:
receiving an identity of a network element from another device; and
determining a location of the device based on the identity of the network element,
wherein the device is connected to the network element providing a connection to a local wireless network and another network.

22. The computer program product according to claim 21, wherein the processor is arranged in a network control element.

23. The computer program product according to claim 22, wherein the network element comprises an access point.

24. The computer program product according to claim 22, wherein the network element comprises a broadband line.

25. A computer program embodied on a computer-readable medium, the computer program configured to control a processor to perform operations comprising:
receiving an identity of a network accessor from an other device; and
determining a location of the other device based on the identity of the network accessor,
wherein the device is connected to a local wireless network via the network accessor, and a connection to another network is provided via the network accessor.

26. The computer program product according to claim 25, wherein the processor is arranged in a network control element.

27. The computer program product according to claim 26, wherein the network element comprises an access point.

28. The computer program product according to claim 26, wherein the network element comprises a broadband line.

29. An apparatus, comprising:
a processor; and
a memory including computer program code,
the memory and the computer program code configured to with the processor, cause the apparatus at least to
receive an identity of a network element from another device, and
determine a location of the other device based on the identity of the network element,
wherein the other device is connected to the network element providing a connection to a local wireless network and another network.

30. An apparatus, comprising:
receiving means for receiving an identity of a network accessor from another device; and
determining means for determining a location of the other device based on the identity of the network accessor,
wherein the other device is connected to a local wireless network via the network accessor, and a connection to another network is provided via the network accessor.

31. An apparatus, comprising:
receiving means for receiving an identity of a network element from another device; and
determining means for determining a location of the other device based on the identity of the network element,
wherein the other terminal is connected to the network element providing a connection to a local wireless network and another network.

* * * * *